Dec. 27, 1938.   J. S. BRANCH   2,142,016
THREE-DRILL TRACTOR HITCH
Filed Oct. 23, 1937
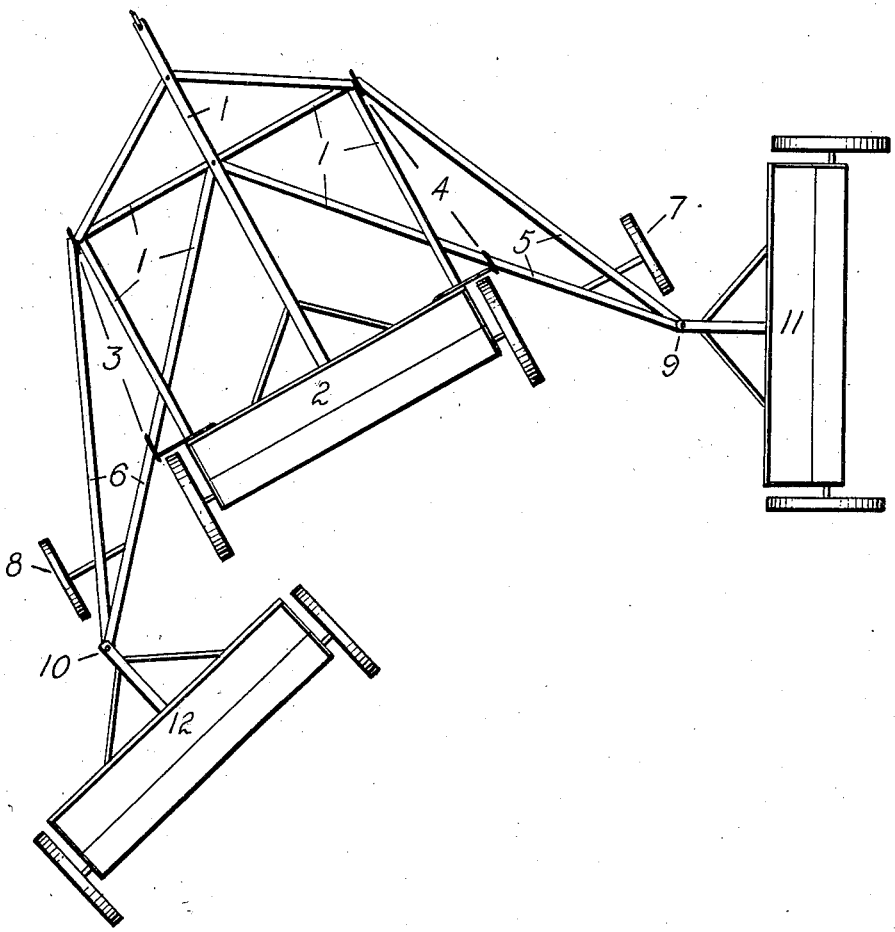
James Silas Branch
INVENTOR
BY *Hubert Vinton Carpenter*
ATTORNEY Patented Dec. 27, 1938

2,142,016

UNITED STATES PATENT OFFICE 2,142,016

THREE-DRILL TRACTOR HITCH

James Silas Branch, Lacrosse, Wash.

Application October 23, 1937, Serial No. 170,620

1 Claim. (Cl. 97—235)

The economies attained on large grain farms by the adoption of the Diesel tractor has made it desirable to develop means whereby sufficient agricultural machinery can be attached to the tractor to give it a proper load. These devices are commonly called hitches.

My invention relates to a means of so attaching two or three grain drills, or similar machines, to a single tractor in such a way that the entire surface of the ground will be properly seeded, which requires that the drills shall be properly spaced with respect to each other while following either a straight or curved path. The device described in more detail below accomplishes this, can be built at a reasonable cost, and is particularly well adapted for use on hilly ground.

The figure of the drawing illustrates the application of the hitch to three drills.

Referring to the drawing, the tongue and its bracing 1 is rigidly attached to the frame of the central drill 2. The end of the tongue is supported by the tractor so that the entire central frame is supported by the tractor and drill. Attached to this central frame by means of two pairs of hinges 3 and 4 are the two side frames 5 and 6. Each side frame has attached rigidly to it an axle with a ground wheel 7 and 8 so that each side frame is supported by its ground wheel and its two hinges. The attachment points 9 and 10 are so located with reference to the central drill that the right and left drills 11 and 12 when attached to these attachment points by means of short tongues of proper length will follow the central drill at a proper spacing while being drawn in either a straight line or while turning. In most makes of drills it is possible to brace and hinge the side frames from behind the main wheels of the center drill instead of as shown in the drawing. This does not change the essential working principle on which my invention is based. Experience shows that the drills will follow around the corner in the fashion shown in the drawing so that the ground will all be seeded properly and without forcing any of the supporting wheels to be dragged sidewise. This may be accomplished as in the drawing by mounting the ground wheels on rigid axles which are in line with the axle of the center drill. The hinged framework makes operation on hilly or uneven ground much less difficult.

In the drawing, and as used in practice, the attachment points are not quite in the theoretical position required for correct operation but are placed a distance forward from this theoretical point. This accomplishes two purposes: first, it shortens the hitch somewhat; and, second, it permits a longer tongue to be used on the two trailing drills. This longer tongue is desirable in order to bring about steadier action of the drill as it is drawn over rough ground. On this account I do not wish to limit my invention by specifying the exact position of the attachment points. It has been found that this approximation to the exact theoretical dimensions gives good results.

If only two drills are to be used one side frame would be omitted.

I claim:

In a means for drawing three grain drills behind a tractor, a combination including a tongue with braces forming a rigid extension of the frame of the central drill and linked to the tractor, said central drill having an axle and wheels, two rigid side frames each hingeably attached to the central extended frame and tongue, two ground wheels, an axle for each ground wheel mounted on each side frame and with said axles in line with the axle of the central drill, an attachment point on each side frame for attachment of a side drill, a short tongue rigidly attached to the frame of each side drill and coupled to one of said attachment points, these points being so located on the side frames that while being drawn around a corner either to the right or left by the tractor the center of the inside wheel of the inside drill can be kept closely in the line of the axle of each of the two outer drills.

JAMES SILAS BRANCH.